(12) United States Patent
Komatani

(10) Patent No.: US 8,317,895 B2
(45) Date of Patent: Nov. 27, 2012

(54) METHOD FOR RECOVERING VALUABLE METALS FROM WASTES

(75) Inventor: Mitsutoyo Komatani, Tokyo (JP)

(73) Assignee: Kohsei Co., Ltd., Tokyo (JP)

( * ) Notice: Subject to any disclaimer, the term of this patent is extended or adjusted under 35 U.S.C. 154(b) by 487 days.

(21) Appl. No.: 11/913,546

(22) PCT Filed: Nov. 30, 2006

(86) PCT No.: PCT/JP2006/324004
§ 371 (c)(1),
(2), (4) Date: Nov. 2, 2007

(87) PCT Pub. No.: WO2008/068810
PCT Pub. Date: Jun. 12, 2008

(65) Prior Publication Data
US 2010/0107817 A1    May 6, 2010

(51) Int. Cl.
*C22B 1/02* (2006.01)
(52) U.S. Cl. .............................. 75/392; 75/30
(58) Field of Classification Search ............... 75/392, 75/30
See application file for complete search history.

(56) References Cited

U.S. PATENT DOCUMENTS
4,071,355 A  *  1/1978  Staggers .................. 75/530

FOREIGN PATENT DOCUMENTS
| JP | 47-42318 A | 12/1972 |
|---|---|---|
| JP | 53-71612 A | 6/1978 |
| JP | 11-050162 A | 2/1999 |
| JP | 2000-204420 A | 7/2000 |
| JP | 2001-214223 A | 8/2001 |
| JP | 2003-183745 A | 7/2003 |
| JP | 2004-285473 A | 10/2004 |

OTHER PUBLICATIONS

Machine translation of JP 2003-183745 (Jul. 2003).*

* cited by examiner

Primary Examiner — Jie Yang
(74) Attorney, Agent, or Firm — Sughrue Mion, PLLC

(57) ABSTRACT

A method for recovering valuable metals, which include at least one M element selected from the group consisting of Mo, Ni and Co, and V, in the form of iron-based alloys from a waste containing the valuable metals, comprising the steps of (a) roasting the waste to form a roasted ore containing oxides of the valuable metals; (b-1) heating the roasted ore together with an iron source and a flux, to form an iron-based alloy melt; (b-2) adding a reducing agent having higher affinity for oxygen than V at a reduction temperature to the melt, thereby reducing the oxides of the valuable metals to form an Fe-M-V alloy melt; (c) oxidizing substantially only V in the Fe-M-V alloy melt to form a V-oxide-containing slag and an Fe-M alloy melt; and (d) separating the V-oxide-containing slag from the Fe-M alloy melt.

12 Claims, 7 Drawing Sheets

METHOD FOR RECOVERING VALUABLE METALS FROM WASTES

FIELD OF THE INVENTION

The present invention relates to a method for recovering valuable metals from wastes such as used desulfurization catalysts for oil refining, boiler ash generated in thermal power plants, etc.

BACKGROUND OF THE INVENTION

Desulfurization catalysts used for oil refining, etc., and boiler sludge, boiler ash, etc. generated from petroleum fuels in thermal power plants, etc. contain high concentrations of valuable metals such as Mo, Ni, V, etc. Because these valuable metals are rare and extremely expensive, it is desirable to recover them in the form of high-concentration iron-based alloys, so that the wastes can be reused as resources.

Japanese Patent 3705472 discloses a method of heating a waste containing Ni, Mo and V at 450-950° C. to remove 1, N and C; mixing it with an iron source such as scale, etc. and a reducing agent such as coke, etc.; pulverizing and granulating the mixture; heating the resultant granules at 1150-1350° C. to conduct the solid-phase reduction of oxides of Fe, Ni and Mo; melting them to form a melt mainly containing Fe, Ni and Mo and a V-oxide-rich flux; subjecting the melt to a dephosphorization treatment to form a low-phosphorus (Ni, Mo)—Fe alloy; and mixing the flux with iron and the reducing agent and heating them to reduce the V oxide in the flux, thereby forming an Fe—V alloy. Because the separation of Ni and Mo from V is conducted by a solid-phase reduction method for reducing the oxides of Ni and Mo without reducing the V oxide in this method, a mixture of the waste, the iron source and the reducing agent is heated at relatively low temperatures of 1150-1350° C.

The above solid-phase reduction method, however, does not fully separate Ni and Mo from V, resulting in an Fe—Ni—Mo alloy containing a relatively large amount of V, and an Fe—V alloy containing relatively large amounts of Ni and Mo. Also, when a waste containing a large amount of P is used, V and P are not fully separated, resulting in a large amount of P contained in the Fe—V alloy. In an attempt to remove only P from this Fe—V alloy melt, V would be predominantly oxidized, resulting in extremely large loss of V by oxidation. Thus, if P were dissolved in the Fe—V alloy, it would actually be difficult to remove P from the Fe—V alloy. In addition, because the oxides of Fe, Ni and Mo are solid-phase-reduced with a carbonaceous reducing agent such as finely pulverized charcoal or coke, etc., the resultant Fe—V alloy contains C, and an attempt to remove C by oxidation like P would oxidize V simultaneously.

Japanese Patent 3450779 discloses a method for recovering metal components from a used catalyst containing V, Mo, Ni and Co with an $Al_2O_3$ carrier, comprising the steps of (a) roasting the used catalyst at 500-800° C. to oxidize the metal components, (b) adding Si and/or Al in an amount of 50-120% by mass based on the stoichiometric amount for reducing the oxides of Mo, Ni and Co to metals, together with CaO, (c) heat-reducing them to form a Mo—Ni—Co alloy and a CaO—$Al_2O_3$ slag containing V oxide, (d) adding Si and/or Al in such an amount as to sufficiently reduce the V oxide contained in the slag separated from the Mo—Ni—Co alloy, (e) forming a V—Si alloy or a V—Al alloy and a CaO—$Al_2O_3$ slag by heat reducing, and (f) separating the V—Si alloy or the V—Al alloy from the slag.

It is actually difficult, however, to control the amount of a reducing agent (Si and/or Al) to reduce only the oxides of Mo, Ni and Co without reducing the V oxide. For instance, when too much Si and/or Al are added, a large amount of the V oxide is reduced, and V is dissolved into the Mo—Ni—Co alloy. On the other hand, when too small amounts of Si and/or Al are added, part of the oxides of Mo, Ni and Co are not oxidized, remaining in the V-oxide-containing slag. Because there is no uniform reducing environment in an actual operation, Si and/or Al may be partially oxidized before participating in the reduction reaction, even if they are weighed accurately. Thus, the amounts of Si and/or Al acting as reducing agents would become insufficient, causing the above problems. It is clear from above that the method of Japanese Patent 3450779 actually fails to separate V from Mo, Ni and Co sufficiently.

Recently, desulfurization catalysts used for oil refining contain an increasingly larger amount of P to exhibit higher performance, but it is difficult to remove only P from a P-containing V alloy because P and V have close oxidizability. Accordingly, when the method of Japanese Patent 3450779 is conducted on the used desulfurization catalysts containing a large amount of P, the formed V—Si alloy or V—Al alloy contains too much P to reduce its concentration, for instance, to a level corresponding to the ISO FeV40 standard, by which the concentration of P is 0.1% by mass or less in an iron-based alloy containing 35-50% by mass of V.

Japanese Patent 3705498 discloses a method for recovering valuable metals of V, Mo and Ni from a waste containing the valuable metals, comprising the steps of (a) roasting the waste at 800-950° C. to form the oxides of V, Mo and Ni, (b) reducing the oxides of Mo and Ni in the waste with Fe to form an Fe—Mo—Ni alloy and a V-oxide-containing slag, and (c) adding a reducing agent to the V-oxide-containing slag to form an Fe—V alloy. However, like Japanese Patent 3450779, weak reduction with Fe fails to separate Mo and Ni from V sufficiently, resulting in large amounts of Mo and Ni contained in the V-oxide-containing slag. Further, when this method is conducted on used desulfurization catalysts with much P, a considerable amount of P remains in the V-oxide-containing slag, resulting in a high concentration of P in the Fe—V alloy formed in a subsequent step, which causes the deterioration of quality.

OBJECTS OF THE INVENTION

Accordingly, an object of the present invention is to provide a method for recovering valuable metals, which include at least one selected from the group consisting of Mo, Ni and Co, and V, in the form of high-quality (low-phosphorus) iron-based alloys from a waste containing the valuable metals efficiently at a high yield.

Another object of the present invention is to provide a method for recovering valuable metals while collecting a by-produced slag in the form of calcium aluminate.

DISCLOSURE OF THE INVENTION

As a result of intense research in view of the above objects, the inventor has found that all oxides of Mo, Ni, Co and V are reduced by reducing agents having high affinity for oxygen, such as Al, Si, C, etc. at sufficiently high temperatures to have valuable metals dissolved in iron-based alloy melts. Paying attention to the fact that P has oxidizability close to those of Mo, Ni and Co, the inventor has also found that when valuable metal oxides are reduced so that all valuable metals are dissolved in an iron-based alloy (or iron) together with P, and when that iron-based alloy is oxidized, substantially only V is oxidized and transferred into a slag. The present invention has been completed based on such findings.

Thus, the first method of the present invention for recovering valuable metals including V in the form of iron-based alloys from a waste containing the valuable metals comprises the steps of roasting the waste; reducing the roasted waste while melting together with an iron source, thereby forming an iron-based alloy melt containing the valuable metals; oxidizing the melt to form a V-oxide-containing slag; and separating the V-oxide-containing slag from the remaining melt.

The second method of the present invention for recovering valuable metals including V in the form of iron-based alloys from a waste containing the valuable metals comprises repeating, after the V-oxide-containing slag is separated, at least one cycle comprising the steps of newly adding a roasted waste to the remaining melt, subjecting the resultant melt to reduction and then oxidation, and separating a newly formed V-oxide-containing slag.

In a preferred embodiment of the present invention, the first method for recovering valuable metals, which include at least one M element selected from the group consisting of Mo, Ni and Co, and V, in the form of iron-based alloys from a waste containing the valuable metals comprises the steps of (a) roasting the waste to form a roasted ore containing oxides of the valuable metals; (b) heating the roasted ore together with an iron source, a flux, and a reducing agent having higher affinity for oxygen than V at a reduction temperature, to reduce the oxides of the valuable metals, thereby forming an Fe-M-V alloy melt; (c) oxidizing substantially only V in the Fe-M-V alloy melt to form a V-oxide-containing slag and an Fe-M alloy melt; and (d) separating the V-oxide-containing slag from the Fe-M alloy melt step.

In another preferred embodiment of the present invention, the first method for recovering valuable metals, which include at least one M element selected from the group consisting of Mo, Ni and Co, and V, in the form of iron-based alloys from a waste containing the valuable metals comprises the steps of (a) roasting the waste to form a roasted ore containing oxides of the valuable metals; (b-1) heating the roasted ore together with an iron source and a flux, to form an iron-based alloy melt; (b-2) adding a reducing agent having higher affinity for oxygen than V at a reduction temperature to the melt, thereby reducing the oxides of the valuable metals to form an Fe-M-V alloy melt; (c) oxidizing substantially only V in the Fe-M-V alloy melt to form a V-oxide-containing slag and an Fe-M alloy melt; and (d) separating the V-oxide-containing slag from the Fe-M alloy melt step.

In a further preferred embodiment of the present invention, the second method comprises repeating, after the step (d), at least one cycle comprising the steps of (e) adding a fresh roasted ore, a flux and a reducing agent having higher affinity for oxygen than V at a reduction temperature to the Fe-M alloy melt, thereby reducing the oxides of the valuable metals, so that the valuable metals are dissolved in the Fe-M alloy melt; (f) oxidizing substantially only V in the resultant Fe-M-V alloy melt to form a V-oxide-containing slag and an Fe-M alloy melt; and (g) separating the V-oxide-containing slag from the Fe-M alloy melt.

In a still further preferred embodiment of the present invention, the second method comprises repeating, after the step (d), at least one cycle comprising the steps of (e-1) adding a fresh roasted ore and a flux to the Fe-M alloy melt, so that the fresh roasted ore is dissolved in the melt; (e-2) adding a reducing agent having higher affinity for oxygen than V at a reduction temperature to the melt, thereby reducing the oxides of the valuable metals, so that the valuable metals are dissolved in the Fe-M alloy melt; (f) oxidizing substantially only V in the resultant Fe-M-V alloy melt to form a V-oxide-containing slag and an Fe-M alloy melt; and (g) separating the V-oxide-containing slag from the Fe-M alloy melt step.

The reducing agent preferably comprises Al and/or Si. The reducing agent preferably further comprises C.

To oxidize V in the Fe-M-V alloy, it is preferable to add lime as the flux and an oxygen gas and/or mill scale as an oxidizing agent to the melt.

A dephosphorization treatment is preferably conducted to the Fe-M alloy melt after the V-oxide-containing slag is separated. The dephosphorization treatment preferably comprises adding lime, silica sand and an oxidizing agent. The dephosphorization treatment turns the Fe-M alloy to a low-phosphorus, low-carbon one.

It is preferable to reduce the V oxide to form an Fe—V alloy, by adding an iron source and a reducing agent having higher affinity for oxygen than V at a reduction temperature to the V-oxide-containing slag, and then heating them.

Using Al as the reducing agent and lime as the flux, it is possible to form slag substantially composed of calcium oxide and alumina. Such slag is obtained after the reduction of the roasted ore, and after the reduction of the V-oxide-containing slag.

BRIEF DESCRIPTION OF THE DRAWINGS

FIG. 2($b$) is a flowchart showing the steps of producing an Fe—V alloy from a V-oxide-containing slag.

FIG. 3($b$) is a schematic view showing a furnace for oxidizing an iron-based alloy melt containing valuable metals.

FIG. 3($c$) is a schematic view showing a furnace for reducing a V-oxide-containing slag.

DESCRIPTION OF THE PREFERRED EMBODIMENTS

Figure 1:
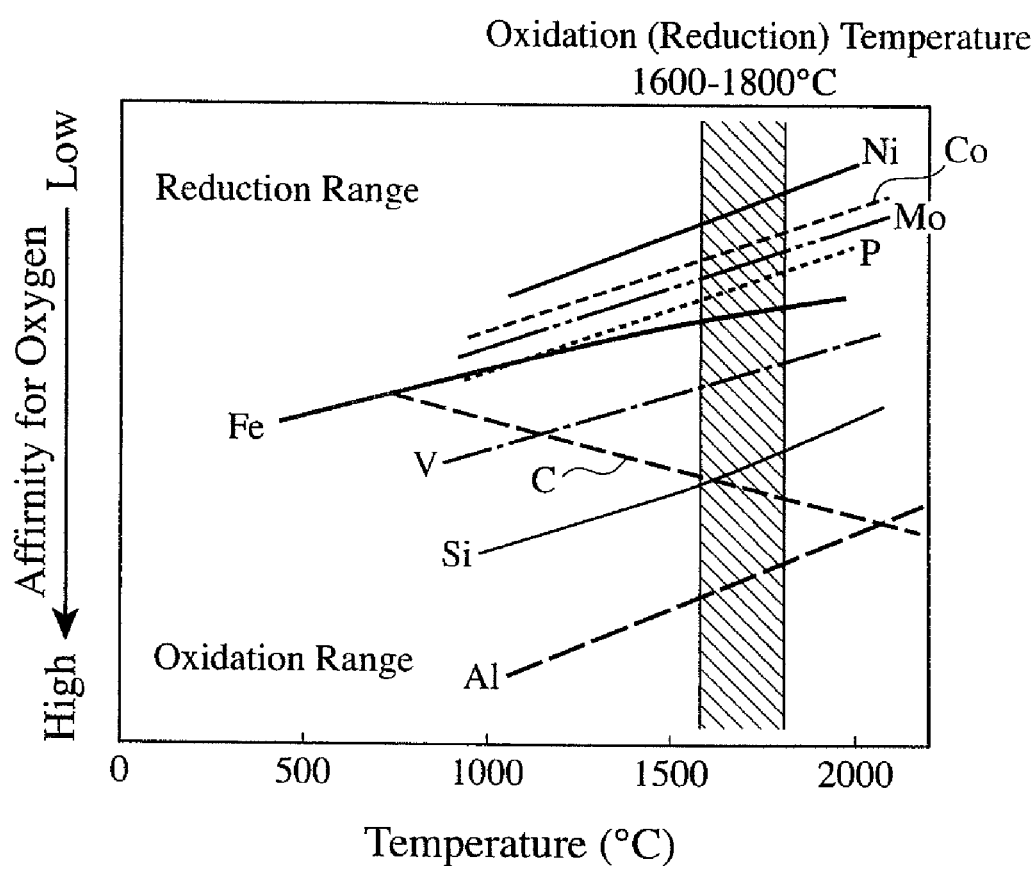
FIG. 1 is a graph schematically showing the change of affinity for oxygen (oxidizability) with temperature with respect to Ni, Mo, Co, P, Fe, V, C, Si and Al.

The method of the present invention is characterized by metallurgically recovering valuable metals including V, particularly valuable metals, which include at least one M element selected from the group consisting of Mo, Ni and Co, and V, in the form of iron-based alloys from a waste containing the valuable metals. First, referring to FIG. 1, which is a graph (Ellingham's diagram) schematically showing the affinity of Fe, Mo, Ni, Co, V, P, Al, Si and C for oxygen, the principle of the metallurgical method of the present invention is explained as compared with conventional methods. Mo, Ni, Co and V are valuable metals, Al, Si and C are reducing agents, Fe is a matrix element having a reducing function and capable of alloying valuable metals, and P is an impurity contained in the waste.

Valuable metals in the form of oxides in the roasted ore are easily reduced by reducing agents, so that they are taken into the iron-based alloy melt. The use of Al as a reducing agent is taken for example for the sake of simplifying explanation. Reduction reactions occur as shown in the following formulae (1)-(4).

$$(MoO_3) + 2[Al] = [Mo] + (Al_2O_3) \quad (1),$$

$$3(NiO) + 2[Al] = 3[Ni] + (Al_2O_3) \quad (2),$$

$$3(CoO) + 2[Al] = 3[Co] + (Al_2O_3) \quad (3), \text{ and}$$

$$3(V_2O_5) + 10[Al] = 6[V] + 5(Al_2O_3) \quad (4),$$

wherein the parentheses indicate components in the slag, and the brackets indicate components in the melt.

When reduction with Fe is conducted as in the method described in Japanese Patent 3705498, the reduction reaction of Mo, Ni and Co proceeds, but the V oxide having strong affinity for oxygen is not reduced, remaining in the slag. P, whose affinity for oxygen is close to that of Fe, also remains in the slag, because it is extremely difficult to reduce P oxide with Fe. Because V has stronger affinity for oxygen than that of P, it is impossible to get only V from a slag containing V and P by reduction. Accordingly, the method of Japanese Patent 3705498 fails to obtain a high-purity Fe—V alloy.

In the method of the present invention, on the contrary, the roasted ore is reduced with a reducing agent having higher affinity for oxygen than that of V, so that all valuable metals are dissolved in an iron-based alloy melt. At this time, P oxide is similarly reduced, so that P is dissolved in the iron-based alloy melt. Thereafter, when the oxidation of the melt is conducted, only V is sufficiently oxidized and transferred into the slag, because V has extremely higher affinity for oxygen than those of other valuable metals and P. Because a high-purity V-oxide-containing slag is obtained, its reduction provides a high-purity Fe—V alloy. Thus, when only V is oxidized after all oxides of valuable metals are reduced, there is no restriction in the reduction and oxidation reactions of V as shown in the above formulae (1)-(4), resulting in a stabilized and efficient operation to provide products with extremely improved purity and uniformity.

[1] First Method for Recovering Valuable Metals

Figure 2A:
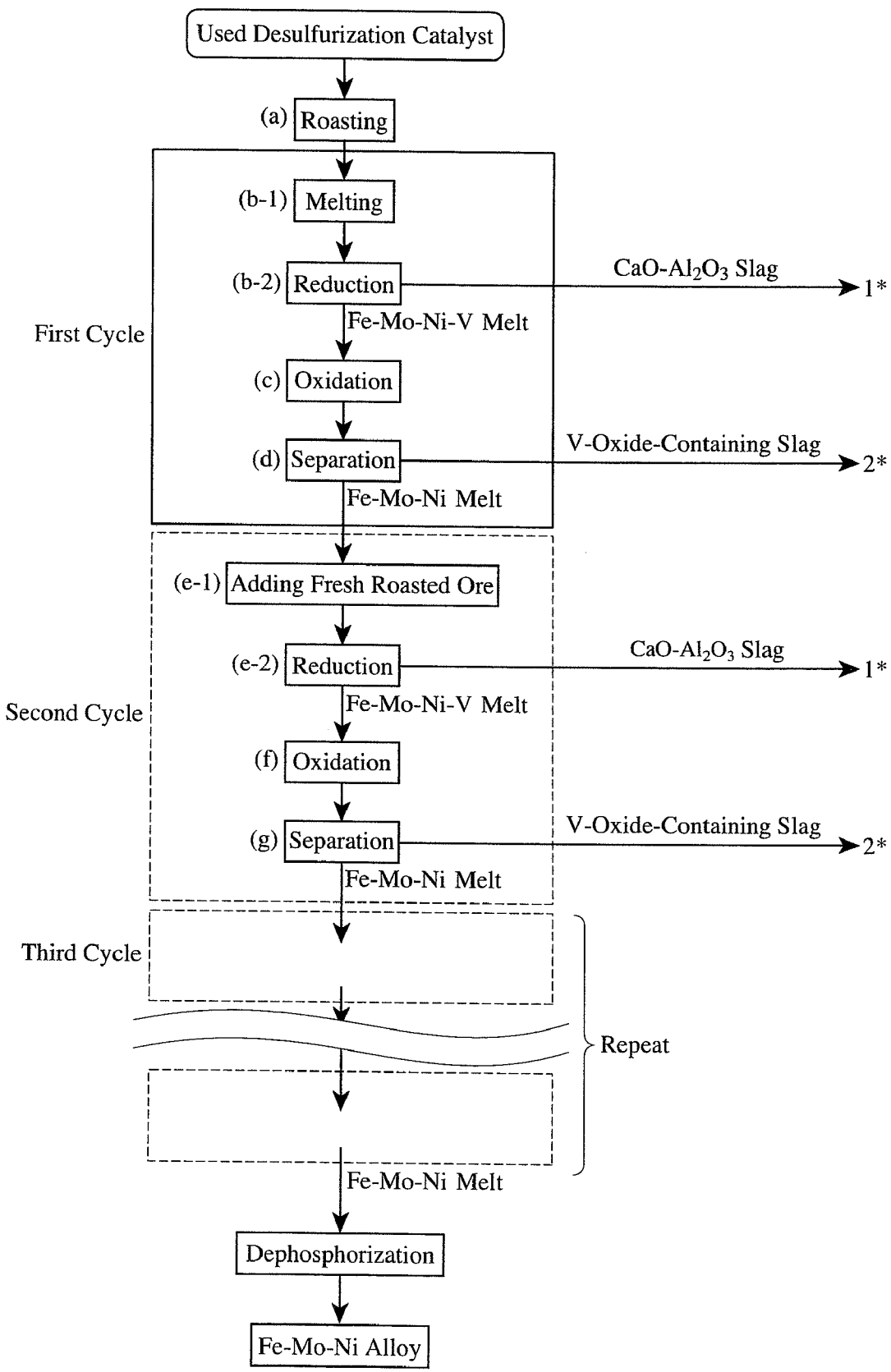
FIG. 2($a$) is a flowchart showing steps in the method of the present invention for recovering valuable metals.

The first method of the present invention corresponds to a first cycle shown in FIG. 2(a). FIG. 2(a) shows a case where the M element is composed of only Mo and Ni for simplicity, but it is not substantially different from a case where the M element is composed of Mo, Ni and Co, because Co has substantially the same affinity for oxygen as that of Mo. Accordingly, specific explanation will be made below on a case where the M element is composed of Mo and Ni, but its explanation is applicable to a case where the M element is composed of Mo, Ni and Co.

(a) Roasting Step

Wastes containing valuable metals may be used desulfurization catalysts, boiler ash, boiler sludge, nickel sludge, etc., which are roasted alone or in combination. When the waste is roasted at 700° C. or higher, for instance, 800-1000° C., not only are the valuable metals oxidized, but the removal of heavy oil, water, volatile components, etc., and desulfurization occur. When the roasting temperature is lower than 700° C., the removal of volatile components and carbonaceous components and the desulfurization are insufficient. On the other hand, when it is higher than 1000° C., molybdenum trioxide ($MoO_3$) sublimes extremely.

(b) Melting/Reducing Step

The method of charging the roasted ore, lime, an iron source and a reducing agent into a furnace is not particularly restricted. Either one of a method (1) comprising heating a mixture of the roasted ore, the flux and the iron source to form a melt and a slag, and then adding the reducing agent, and a method (2) comprising heating a mixture of the roasted ore, the flux, the iron source and the reducing agent, causing melting and reduction simultaneously to form a melt and a slag, may be used, though the method (1) is more preferable. FIG. 2(a) shows the method (1). In either case, an iron-based melt may be formed before charging the roasted ore, etc. All roasted ore, etc. need not be added at a time, but additional roasted ore, flux, iron source and reducing agent may be gradually added, after the melt and the slag are formed. When a sufficiently large amount of the slag, a mixture of calcium oxide and alumina, is formed, part of it may be removed from the furnace.

The reducing agent should have higher affinity for oxygen than that of V at a reduction temperature, and specifically it is preferably Al and/or Si. If necessary, low-cost, highly-reductive C may further be used. Al and Si are preferably simple substances (metals), and C is preferably coke, etc. The amount of C added should be equal to or less than a stoichiometric amount for reducing the oxides of valuable metals, preferably 75% by mass or more and less than 100% by mass of the stoichiometric amount. When too much C is added, a large amount of C is taken into the iron-based alloy melt, so that a subsequent decarburization step should be conducted for a long period of time.

The flux is preferably lime, which provides, when used together with a reducing agent composed of metallic Al, a high-purity mixture of calcium oxide and alumina (called "calcium aluminate" depending on its composition) containing little P. When the slag is taken out during the reducing step, the flux such as lime, etc. may be supplemented, if necessary.

Substantially all of Mo, Ni, V and impurity P formed by reduction are dissolved in a melt of an iron-based alloy (or iron). The resultant iron-based alloy is called simply "Fe—Mo—Ni—V alloy." With the total amount of valuable metals in the roasted ore being 100% by mass, a reduction reaction is preferably conducted until the total amount of valuable metals transferred into the melt reaches 90% by mass or more. The total amount of valuable metals transferred into the melt is more preferably 95% by mass or more. The reduction temperature is preferably 1500° C. or higher, more preferably 1600-2000° C., most preferably 1600-1800° C., particularly 1600-1700° C.

Figure 3A:
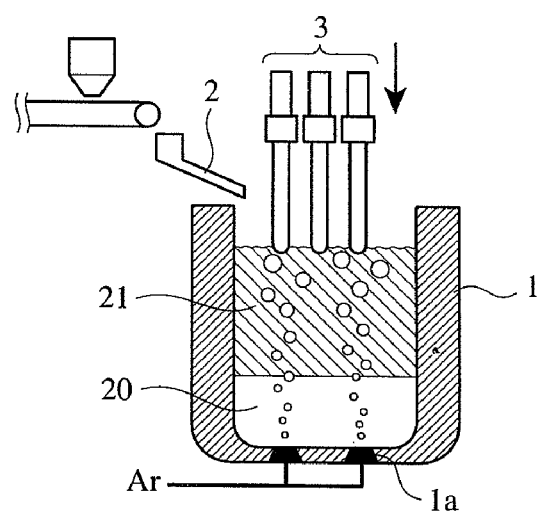
FIG. 3($a$) is a schematic view showing a furnace for melting and reducing a roasted ore.

The melting/reducing step may be conducted, for instance, in the furnace 1 shown in FIG. 3(a). The furnace 1 has an inlet 1a for supplying an Ar gas at the bottom, and there is a means 2 such as a conveyer, etc. for charging the roasted ore, the flux, the iron source and the reducing agent into the furnace 1 from above. Provided above the furnace 1 is an alternate-current, heating graphite electrode 3. The graphite electrode 3 is lowered to a position in contact with the flux, to generate arc for heating. With bubbling of a melt 20 and a slag 21 with an Ar gas charged into the furnace 1 through the inlet 1a, the melt 20 and the slag 21 are stirred, causing a reduction reaction efficiently.

(c) Oxidation Step

Figure 3B:
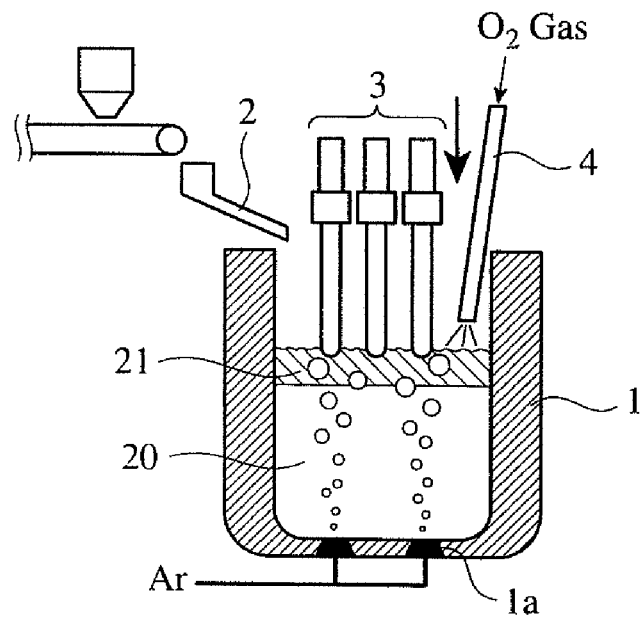

When the Fe—Mo—Ni—V alloy melt, in which substantially all valuable metals and P in the roasted ore are dissolved, is put under an oxidation condition, only V is oxidized to form a slag containing V oxide (hereinafter referred to as "V-oxide-containing slag"). The oxidation of the melt can be conducted by a method of blowing an oxygen gas into the melt, or a method of adding an oxidizing agent such as mill scale, etc. Of course, these methods may be combined. As shown in FIG. 3(b), while stirring the melt 20 by bubbling with an Ar gas, an oxygen gas is blown into the melt 20 through an oxygen-gas-supplying pipe 4, thereby oxidizing only V. Of course, the oxygen-gas-supplying pipe 4 may be inserted into the melt 20 for bubbling with an oxygen gas.

The oxidation temperature may be essentially the same as the reduction temperature, and specifically it is preferably 1500° C. or higher, more preferably 1600-2000° C., most preferably 1600-1800° C., particularly 1600-1700° C. The most preferred temperature ranges of oxidation and reduction are shown in FIG. 1.

(d) Step of Separating V-Oxide-Containing Slag from Fe-M Alloy Melt

To form an Fe—V alloy, the V-oxide-containing slag is separated from the Fe—Mo—Ni alloy. The separation of the V-oxide-containing slag can be conducted, for instance, by transferring the V-oxide-containing slag formed on the Fe—Mo—Ni alloy melt to another vessel by slanting the furnace.

[2] Second Method for Recovering Valuable Metals

In view of the fact that the Fe—Mo—Ni alloy obtained by the first method does not contain Mo and Ni at high concentrations, the second method comprises repeating reduction and oxidation by adding a fresh roasted ore to the Fe—Mo—Ni alloy melt, to increase the concentrations of Mo and Ni in the Fe—Mo—Ni alloy. Specifically, after the same steps (a)-(d) as in the first method, the second method repeats at least one cycle comprising the steps of (e-1) adding a fresh roasted ore to the Fe—Mo—Ni alloy melt, (e-2) reducing the roasted ore to form an Fe—Mo—Ni—V alloy melt, (f) oxidizing only V in the Fe—Mo—Ni—V alloy melt to form a V-oxide-containing slag, and (g) separating the Fe—Mo—Ni alloy melt from the V-oxide-containing slag. Of course, the steps (e-1) and (e-2) may be conducted in a single step. For the convenience of explanation, the steps (b)-(d) are called "first cycle," and the steps (e)-(g) are called "second cycle," "third cycle," . . . .

The second and subsequent cycles are preferably repeated until the total concentration of Mo and Ni in the Fe—Mo—Ni alloy reaches 40% by mass or more, particularly 50% by mass or more. However, because P is distributed between the alloy melt and the slag at a constant ratio, the concentration of P increases both in the melt and the V-oxide-containing slag by repeating the cycles. Accordingly, it is preferable to keep the Fe—Mo—Ni alloy low in a phosphorus percentage by repeating the cycles as long as the concentration of P in the V-oxide-containing slag does not exceed a predetermined level, or by conducting a dephosphorization treatment during the cycle. Referring to FIG. 2(a), the steps (e-1)-(g) will be explained below.

(e-1) Step of Adding Fresh Roasted Ore

A fresh roasted ore is added to the Fe—Mo—Ni alloy melt obtained in the step (d), and a fresh flux such as lime, etc. is also preferably added. The roasted ore is rapidly melted in the presence of the melt.

(e-2) Reducing Step

A reducing agent is added to a slag formed by melting the fresh roasted ore, to reduce the oxides of valuable metals (Mo oxide, Ni oxide, and V oxide) in the roasted ore, so that the valuable metals are dissolved in the Fe—Mo—Ni alloy melt. Of course, P oxide in the roasted ore is also reduced. The reducing agent and the reduction conditions (temperature, etc.) may be the same as in the first method. Incidentally, the fresh roasted ore and the reducing agent may be added at one time to conduct the step (e-1) and the step (e-2) simultaneously.

(f) Oxidation Step

The oxidation step may be conducted substantially in the same manner as in the step (c) in the first method.

(g) Step of Separating V-Oxide-Containing Slag from Fe-M Alloy Melt

This separating step may be conducted substantially in the same manner as in the step (d) in the first method.

(h) Change with Time of Amounts of Melt and Slag

Figure 4:
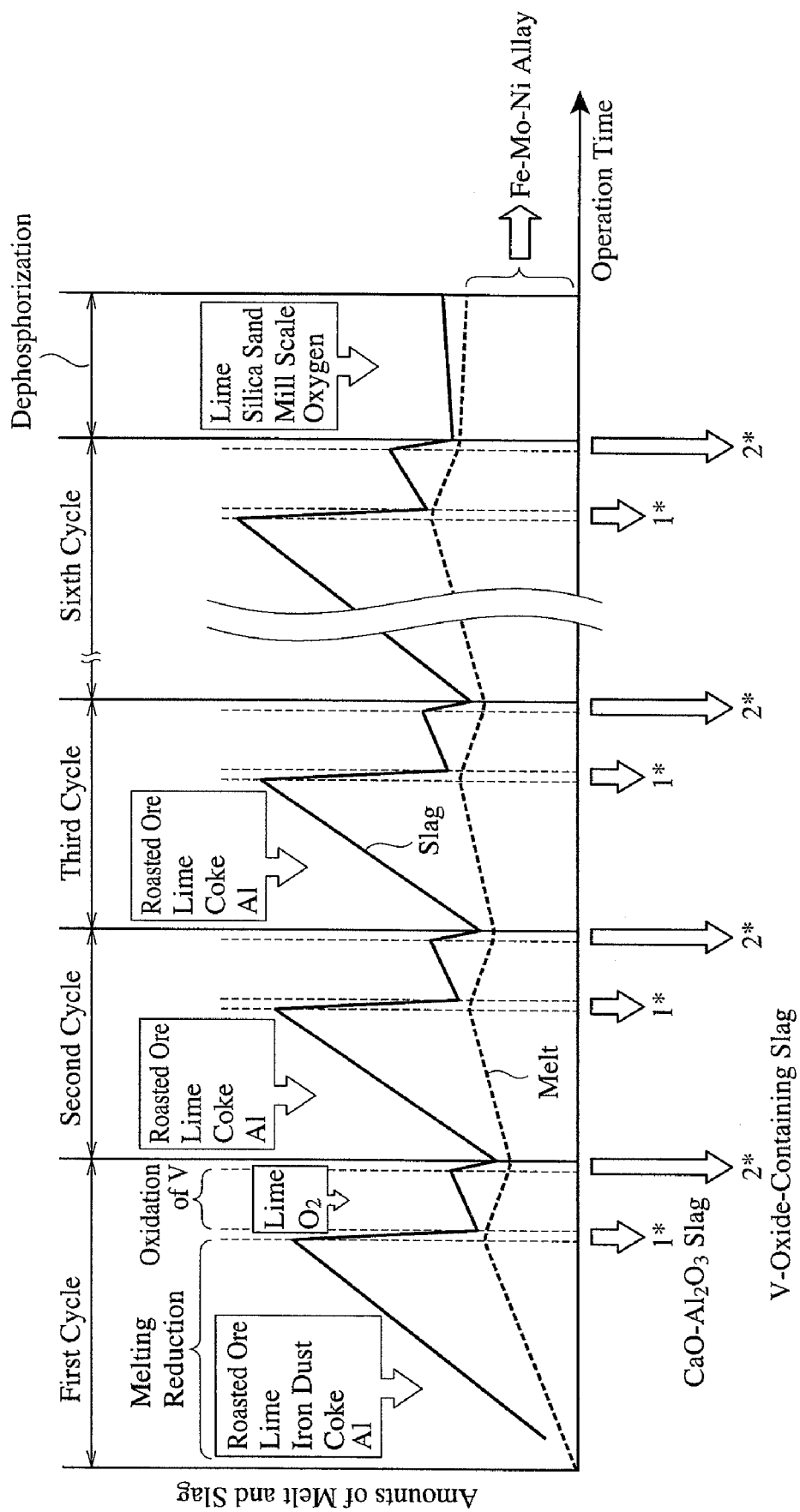
FIG. 4 is a graph schematically showing the amount change with time of a slag and a melt from cycle to cycle in the second method of the present invention.

In a case where the second method is conducted to the sixth cycle, the change with time of the amounts of the melt and the slag is schematically shown in FIG. 4. In this example, a roasted ore, lime, iron dust and coke are charged into the furnace in the melting/reducing steps (b) and (e), and bubbling is conducted with oxygen after lime as the flux is charged in the oxidation steps (c) and (f). In the dephosphorization step after the sixth cycle, lime, silica sand, mill scale and oxygen are used. The asterisk in the figure indicates that a $CaO.Al_2O_3$ slag and a V-oxide-containing slag are used in the treatment shown in FIG. 2(b).

[3] Dephosphorization Step

Because the Fe—Mo—Ni—V alloy melt is oxidized to form a V-oxide-containing slag in the method of the present invention, P is substantially not transferred into the V-oxide-containing slag but remains in the Fe—Mo—Ni alloy melt. Accordingly, the Fe—Mo—Ni alloy is preferably dephosphorized in both first and second methods. Because the dephosphorization treatment per se is known, its detailed explanation will be omitted. It is preferable to use a flux easily taking the formed phosphorus oxide. Specifically, lime and silica sand are preferably used. The use of such flux forms a $CaO—SiO_2—FeO$ slag, resulting in efficient dephosphorization in the Fe—Mo—Ni alloy melt. It is preferable to use an oxygen gas and/or mill scale as the oxidizing agent. The dephosphorization temperature is preferably 1500° C. or higher, more preferably 1600-2000° C., most preferably 1600-1800° C.

[4] Step of Reducing V-Oxide-Containing Slag

Figure 2B:
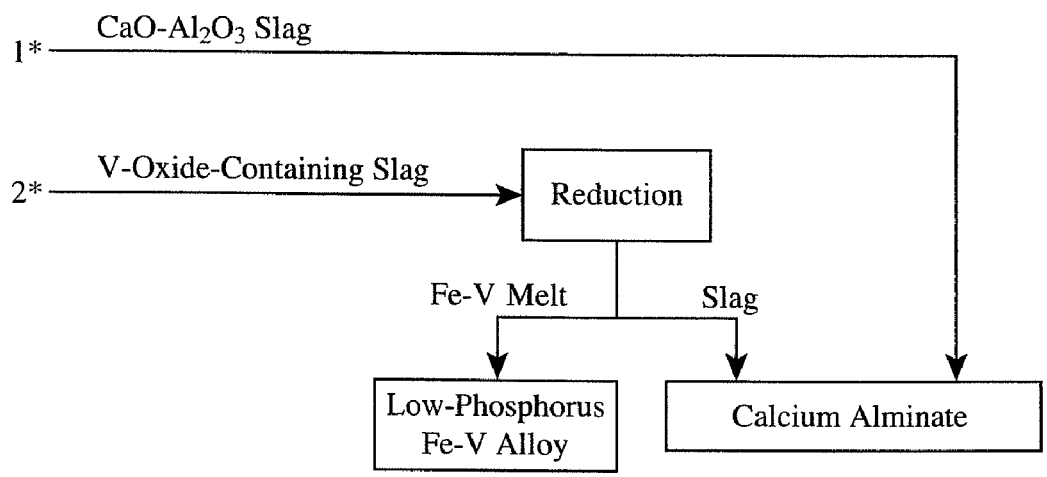
Figure 3C:
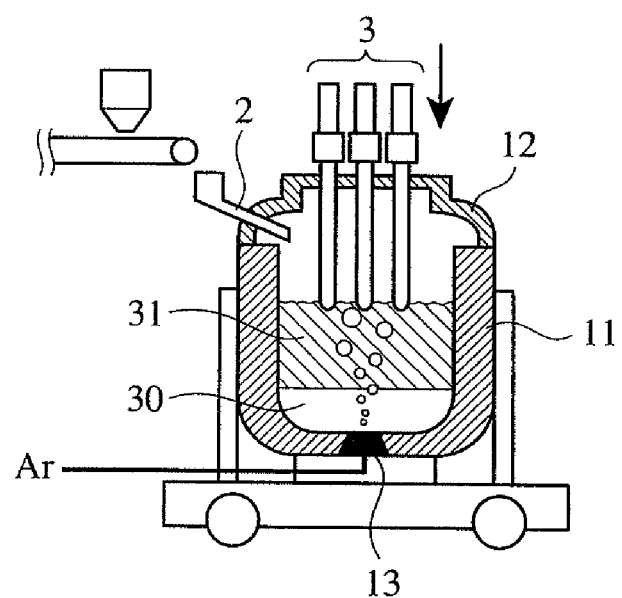

As shown in FIG. 2(b), the reduction of the V-oxide-containing slag in the presence of an iron source forms an Fe—V alloy. Specifically, after the V-oxide-containing slag is charged, for instance, into the furnace 11 shown in FIG. 3(c), lime (flux), the iron source and the reducing agent are charged. The furnace 11 has an Ar-gas-supplying inlet 13 in the bottom. To suppress the concentration of N in the Fe—V melt from increasing by $N_2$ in the air, the furnace 11 preferably has a lid 12. There is a means 2 (conveyer, etc.) for charging the flux, the iron source and the reducing agent into the furnace 11 from above. There is also a heating graphite electrode 3 above the furnace 11. With an Ar gas introduced into the melt 30 and the slag 31 in the furnace 11 through the inlet 13 for bubbling, the melt 30 and the slag 31 are stirred so that a reduction reaction proceeds efficiently.

The reduction temperature of the V oxide is preferably 1500° C. or higher, more preferably 1600-2000° C., most preferably 1600-1800° C. The reducing agent may be Al, Si, C, etc. Specifically, metallic Al, Al dross, metallic Si, coke, etc. are preferable. In the second method, the V-oxide-containing slag obtained by pluralities of separation steps may be reduced separately or in combination. The reduction of V oxide per se is known, and can be conducted by other methods such as a thermite process, etc.

[5] Recovering of Calcium Aluminate

When lime and aluminum are used as a flux and a reducing agent, respectively, in the method of the present invention, a CaO—$Al_2O_3$ slag useful as a desulfurizing agent for iron production, etc. are formed. Incidentally, $Al_2O_3$ is transferred from the used catalyst carrier into the slag. The CaO—$Al_2O_3$ slag is recovered mainly in the reducing steps (b-2), (e-2) and in the step of reducing the V-oxide-containing slag. If necessary, lime or alumina may be added to the resultant slag to adjust to a suitable CaO/$Al_2O_3$ mass ratio. The preferred CaO/$Al_2O_3$ mass ratio is 0.5-0.7. The recovering of the CaO—$Al_2O_3$ slag contributes to decrease in secondary industrial wastes. The resultant calcium aluminate may be used as a desulfurizing agent for iron production, an alternative flux to fluorite, etc.

The present invention will be described in further detail referring to Examples and Reference Examples below without intention of restricting the present invention thereto.

REFERENCE EXAMPLE 1

Oxidation of V in Fe—Mo—Ni—V Alloy

Figure 5:
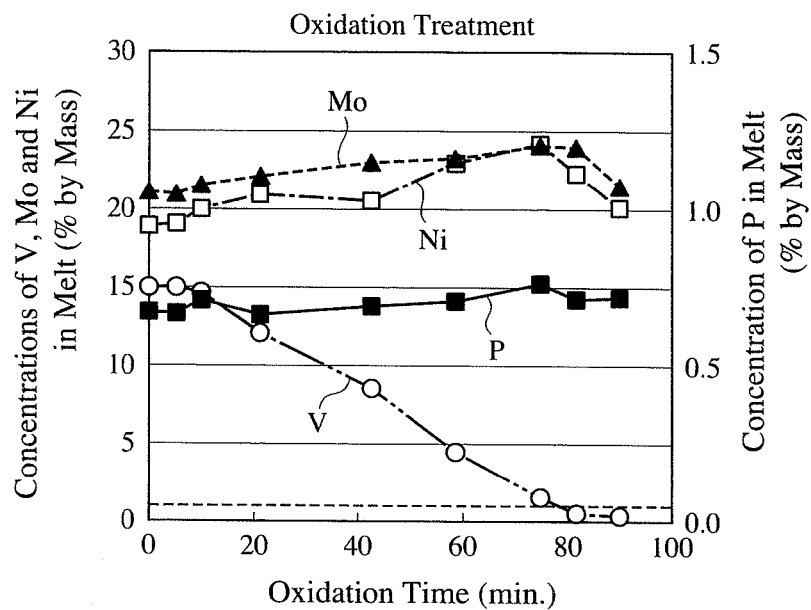
FIG. 5 is a graph showing the concentration change with time of Mo, Ni, V and P when the Fe—Mo—Ni—V alloy melt containing P is oxidized in Reference Example 1.

Lime was charged into a furnace 1 shown in FIG. 3(*b*), which contained about 6 tons of an Fe—Mo—Ni—V alloy melt comprising 15.0% by mass of V, 18.8% by mass of Ni, 20.1% by mass of Mo, and 0.65% by mass of P, the balance being substantially Fe, and an oxygen gas was blown into the melt at a speed of 7 $Nm^3$/min through an inlet pipe 4 attached to an upper portion of the furnace 1, while keeping the melt at 1650° C. The concentration changes with time of V, Ni, Mo and P in the melt are shown in FIG. 5. It is verified that only V was selectively oxidized in the Fe—Mo—Ni—V alloy melt, from the fact that only V decreased as the oxidation time, with substantially no change in the concentrations of other elements. Even when the concentration of V in the melt decreased to 1% by mass, there was only extremely small decrease in the concentrations of Ni and Mo, with most P remaining in the melt. This verifies that when the Fe—Mo—Ni—V alloy melt containing P is oxidized, substantially only V is oxidized, resulting in a V-oxide-containing slag with small phosphorus content.

EXAMPLE 1

Valuable metals were recovered from various waste mixtures having the compositions shown in Table 1 by a six-cycle treatment according to the flowcharts shown in FIGS. 2(*a*) and 2(*b*).

(1) Roasting Step

Various wastes shown in Table 1 were charged at speeds shown in Table 1 into a rotary kiln with the capability of 100 tons/day, so that they were roasted at 950° C. Oil components, solid carbonaceous components and sulfur components contained in the waste were all burn out. The compositions of the resultant roasted ores are shown in Table 2. The weight of the waste charged decreased to about ½ by the roasting step.

TABLE 1

| Waste | Composition (% by mass) | | | | | | | Charging Speed (tons/hr) |
|---|---|---|---|---|---|---|---|---|
|  | Mo | Ni | V | P | $Al_2O_3$ | $SiO_2$ | FeO |  |
| Used Desulfurization Catalyst | 4.04 | 2.76 | 7.82 | 0.068 | 30.8 | 0.7 | 0.58 | 2.52 |
| Sludge | 0.00 | 0.41 | 0.65 | 0.003 | 0.1 | 0.2 | 0.85 | 0.18 |
| Boiler Ash | 0.03 | 0.76 | 4.23 | 0.018 | 0.4 | 1.9 | 0.62 | 1.45 |
| Ni Sludge | 0.15 | 4.25 | 1.42 | 0.025 | 0.0 | 0.9 | 0.50 | 0.04 |
| Average Composition of Mixture | 2.44 | 1.98 | 6.21 | 0.047 | 18.7 | 1.1 | 0.60 | — |

TABLE 2

| Composition (% by mass) of Roasted Ore | | | | | | |
|---|---|---|---|---|---|---|
| Mo | Ni | V | P | $Al_2O_3$ | $SiO_2$ | Fe |
| 4.91 | 4.30 | 12.05 | 0.162 | 46.2 | 1.81 | 1.33 |

(2) First Cycle 8 tons of a roasted ore, 3.6 tons of lime and 3.0 tons of iron dust were charged into a furnace 1 of 7,000 kVA schematically shown in FIG. 3(*a*), and after the roasted ore was melted, 0.5 tons of coke and 1.1 tons of Al as reducing agents were added to conduct reduction, thereby forming a melt in which substantially all Mo, Ni, V, Fe and impurity P were dissolved. Both melting temperature and reduction temperature were 1600-1700° C. The resultant slag was recovered as calcium aluminate.

Figure 6:
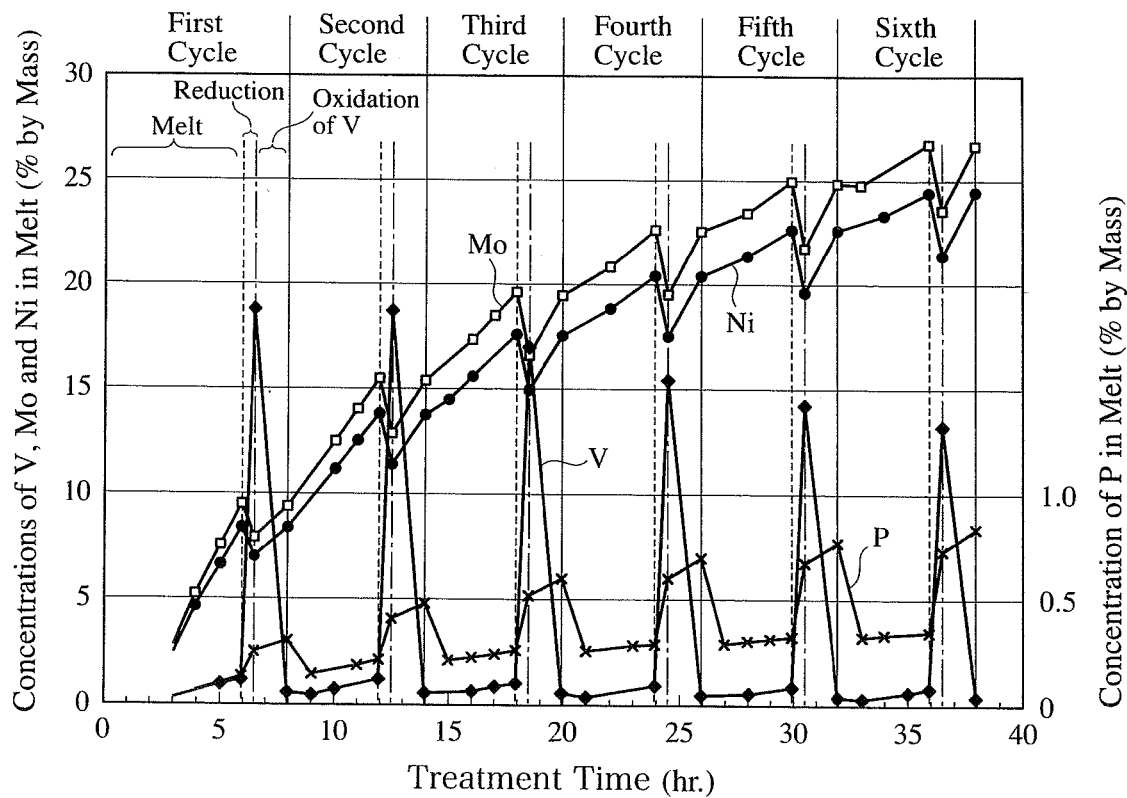
FIG. 6 is a graph showing the concentration change with time of Mo, Ni, V and P in the Fe—Mo—Ni—V alloy melt containing P, in the second method of the present invention.

With fresh lime added, an oxygen gas was blown into the melt at 1600-1700° C. in the furnace 1 from above as shown in FIG. 3(*b*), to conduct an oxidation treatment. As is clear from FIG. 6 showing the concentration change with time of Mo, Ni, V and P in the Fe—Mo—Ni—V alloy melt, substantially only V was oxidized, and the resultant V-oxide-containing slag was separated in a molten state from the remaining melt (Fe—Mo—Ni alloy).

(3) Second to Sixth Cycles

Melting, reduction and oxidation were conducted in the same manner as in the first cycle except for newly adding 8 tons of roasted ore and 3.6 tons of lime to the Fe—Mo—Ni alloy melt obtained by the first cycle, and the resultant V-oxide-containing slag and Fe—Mo—Ni alloy were separated (second cycle). The same operation as in the second cycle was repeated until the total concentration of Mo and Ni in the Fe—Mo—Ni alloy reached 50% by mass or more (third to sixth cycles).

(4) Reduction of V Oxide

The V-oxide-containing slag obtained by each cycle was charged into a furnace 11 of 5,000 kVA schematically shown in FIG. 3(*c*), and then lime, iron dust and Al were added. By the reduction of V oxide, a slag composed of an Fe—V alloy melt and CaO—$Al_2O_3$ was obtained.

(5) Dephosphorization Treatment

After the V-oxide-containing slag was removed, lime, silica sand and mill scale were added to the Fe—Mo—Ni alloy melt obtained by the sixth cycle, and an oxygen gas was blown into the melt at 1600-1700° C. from above to conduct a dephosphorization treatment.

(6) Results

The concentration changes with time of Mo, Ni, V and P in the melt in the furnace 1 in the first to sixth cycles are shown in FIG. 6, the composition and weight of slag [CaO.Al$_2$O$_3$ slag in FIG. 2(a)] obtained after the reducing step in each cycle are shown in Table 3, and the composition, V/P mass ratio and weight of the V-oxide-containing slag obtained in each cycle are shown in Table 4.

TABLE 3

Slag Obtained by Reducing Step

| | Composition (% by mass) | | | | Weight (tons) |
|---|---|---|---|---|---|
| Cycle | V | P | CaO | Al$_2$O$_3$ | of Slag |
| First Cycle | 0.44 | 0.006 | 31.7 | 51.9 | 9.95 |
| Second Cycle | 0.44 | 0.009 | 32.4 | 52.8 | 10.20 |
| Third Cycle | 0.41 | 0.012 | 32.2 | 52.8 | 10.22 |
| Fourth Cycle | 0.38 | 0.012 | 32.1 | 52.8 | 10.22 |
| Fifth Cycle | 0.35 | 0.013 | 32.1 | 52.8 | 10.23 |
| Sixth Cycle | 0.33 | 0.015 | 32.1 | 52.8 | 10.23 |
| Total | — | — | — | — | 61.05 |

TABLE 4

V-Oxide-Containing Slag

| | Composition (% by mass) | | | | V/P | Weight (tons) |
|---|---|---|---|---|---|---|
| Cycle | V | P | CaO | Al$_2$O$_3$ | Ratio | of Slag |
| First Cycle | 28.8 | 0.028 | 31.0 | 8.6 | 1036 | 3.01 |
| Second Cycle | 30.6 | 0.048 | 27.9 | 7.9 | 643 | 3.36 |
| Third Cycle | 30.4 | 0.067 | 27.3 | 7.7 | 456 | 3.43 |
| Fourth Cycle | 30.1 | 0.073 | 26.9 | 7.6 | 415 | 3.48 |
| Fifth Cycle | 29.8 | 0.080 | 26.6 | 7.5 | 373 | 3.52 |
| Sixth Cycle | 29.5 | 0.084 | 26.3 | 7.4 | 352 | 3.56 |

As is clear from FIG. 6 and Tables 3 and 4, (a) the concentrations of Mo, Ni and P in the melt gradually increased every cycle, while the concentration of V in the melt drastically dropped in each oxidation step; (b) the concentration of V in the V-oxide-containing slag was substantially the same in any cycle; (c) the concentration of P in the melt in the furnace 1 gradually increased every cycle, while it was extremely low in the slag obtained after the reducing step and in the V-oxide-containing slag. Increase in the concentration of P in the melt every cycle appears to be due to the fact that P was substantially not transferred to the slag but accumulated in the melt. The V-oxide-containing slag obtained after the sixth cycle had a V/P mass ratio of more than 300, indicating that an Fe—V alloy with a sufficiently low phosphorus content was obtained.

Table 5 shows the compositions and weight of the Fe—V alloy and the remaining slag that were obtained by reducing the V-oxide-containing slag. As is clear from Table 5, the concentration of V in the Fe—V alloy was extremely high, about 50% by mass or more. Although the concentration of P in the Fe—V alloy gradually increased every cycle, it met the target of 0.15% by mass or less in every cycle. As a result of the first to sixth cycles, 10 tons of an Fe—V alloy (corresponding to Fe-50% V) and 80 tons (total slag shown in Tables 3 and 5) of calcium aluminate were obtained.

TABLE 5

Compositions of Fe—V Alloy And Remaining Slag

| | Fe—V Alloy | | | Remaining Slag | | |
|---|---|---|---|---|---|---|
| | Composition (% by mass) | | Weight | Composition (% by mass) | | Weight |
| Cycle | V | P | (tons) | CaO | Al$_2$O$_3$ | (tons) |
| First Cycle | 53.7 | 0.054 | 1.29 | 38.9 | 55.6 | 2.63 |
| Second Cycle | 47.2 | 0.076 | 1.78 | 38.5 | 56.5 | 3.08 |
| Third Cycle | 49.6 | 0.112 | 1.73 | 37.8 | 57.2 | 3.15 |
| Fourth Cycle | 53.5 | 0.133 | 1.61 | 37.8 | 57.2 | 3.20 |
| Fifth Cycle | 52.6 | 0.145 | 1.64 | 36.1 | 58.8 | 3.16 |
| Sixth Cycle | 50.3 | 0.148 | 2.00 | 37.4 | 57.6 | 3.80 |
| Total | — | — | 10.05 | — | — | 19.02 |

Table 6 shows the compositions of the Fe—Mo—Ni alloy before and after the dephosphorization. The concentrations of P and S in the Fe—Mo—Ni alloy (yield: about 6.4 tons) after the dephosphorization were extremely low, 0.07% by mass and 0.04% by mass, respectively. This fully met the standards (for instance, [P]≦0.1% by mass, and [S]≦0.1% by mass) generally required for stainless steel materials.

TABLE 6

Composition of Fe—Mo—Ni Alloy

| | Composition (% by mass) | | | | | |
|---|---|---|---|---|---|---|
| | Mo | Ni | V | C | P | S |
| Before Dephosphorization | 26.6 | 24.4 | 0.40 | 0.08 | 0.84 | 0.06 |
| After Dephosphorization | 26.5 | 24.6 | 0.03 | 0.07 | 0.07 | 0.04 |

REFERENCE EXAMPLE 2

Dephosphorization of Fe—Mo—Ni Alloy Melt

Figure 7:
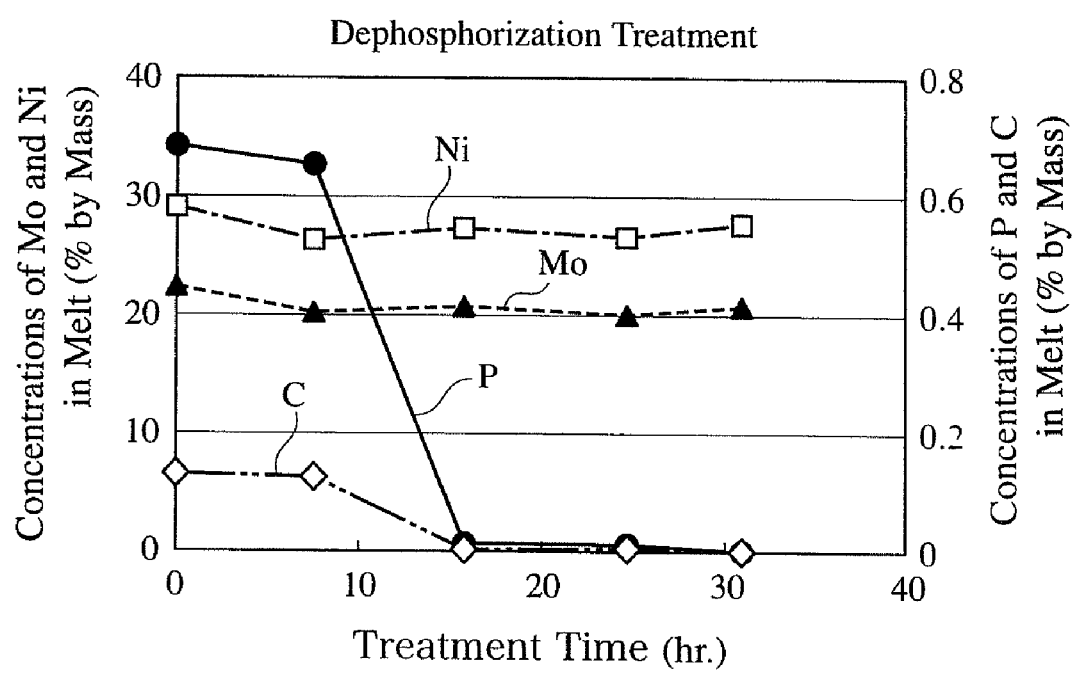
FIG. 7 is a graph showing the concentration change with time of Mo, Ni, C and P when the Fe—Mo—Ni alloy melt containing P is dephosphorized in Reference Example 2.

Lime, silica sand and mill scale were added to about 6 tons of a P-containing Fe—Mo—Ni alloy melt 20 at about 1600° C. in the furnace 1 shown in FIG. 3(b), and an oxygen gas was blown into the melt in the furnace from above. An Ar gas was also blown into the melt for stirring through an inlet 1a at the bottom of the furnace 1. FIG. 7 shows the concentration changes with time of Mo, Ni and P in the melt. It is clear from FIG. 7 that almost all P was removed from the melt by the dephosphorization treatment for 15 minutes. This indicates that the Fe—Mo—Ni alloy melt can be relatively easily dephosphorized. The dephosphorization treatment reduced the amounts of Ni and Mo in the melt only slightly. The dephosphorization treatment simultaneously removed C, resulting in a low-phosphorus, low-carbon Fe—Mo—Ni alloy.

EFFECT OF THE INVENTION

The method of the present invention can efficiently produce an iron-based alloy containing V and an iron-based alloy containing other valuable metals at high purity, because all oxides of valuable metals including V are reduced so that the valuable metals are first dissolved in an iron-based melt, and only highly oxidizable V is then oxidized to be separated from other valuable metals. In addition, because a melt containing all valuable metals is oxidized, only extremely high-oxidizability V can be oxidized even if P is contained. Because the resultant V oxide does not substantially contain P, the reduction of the V oxide in the presence of an iron source provides a high-quality Fe—V alloy.

By repeating at least one cycle comprising a step of adding a fresh roasted ore to the melt after the V-oxide-containing slag is separated, and the same reduction, oxidation and separation steps as in the first cycle, an iron-based alloy containing Mo, Ni and Co at high concentrations can be obtained.

Because a high-purity mixture of calcium oxide and alumina (called "calcium aluminate") is formed as a byproduct as slag, it can be recovered to extremely reduce the amounts of secondary wastes, and used as a desulfurizing agent for iron production, an alternative flux to fluorite, etc.

What is claimed is:

1. A method for recovering valuable metals from a waste the method comprising the steps of (a) roasting said waste comprising P and said valuable metals, wherein said valuable metals comprise V and at least one selected from the group consisting of Mo, Ni and Co; (b) reducing all oxides of the valuable metals and P in the roasted waste by a reducing agent composed of metallic Al and/or Si while melting together with an iron source, thereby forming an iron-based alloy melt containing said valuable metals and P; (c) oxidizing substantially only V by adding an oxygen gas to form a V-oxide-containing slag with a small phosphorus content; and (d) separating said V-oxide-containing slag from the remaining melt containing valuable metals other than V.

2. The method for recovering valuable metals according to claim 1, comprising repeating, after said V-oxide-containing slag is separated, at least one cycle comprising the steps of newly adding a roasted waste to the remaining melt, subjecting the resultant melt to reduction and then oxidation, and separating a newly formed V-oxide-containing slag.

3. The method for recovering valuable metals according to claim 1, wherein lime as the flux is added to said iron-based alloy melt, to oxidize V in said melt.

4. The method for recovering valuable metals according to claim 1, wherein after said V-oxide-containing slag is separated, said remaining melt is subjected to a dephosphorization treatment.

5. The method for recovering valuable metals according to claim 1, further comprising a step of adding an iron source and a reducing agent having higher affinity for oxygen than V at a reduction temperature to said V-oxide-containing slag, and heating them, thereby reducing said V oxide to form an Fe—V alloy.

6. The method for recovering valuable metals according to claim 1, comprising using Al as said reducing agent and lime as said flux to obtain a slag substantially composed of calcium oxide and alumina.

7. A method for recovering valuable metals, from a waste, comprising the steps of
   (a) roasting said waste comprising P and said valuable metals, wherein said valuable metals comprise V and at least one selected from the group consisting of Mo, Ni and Co, to form a roasted ore containing oxides of said valuable metals;
   (b) heating said roasted ore together with an iron source, a flux, and a reducing agent composed of metallic Al and/or Si, to reduce the oxides of said valuable metals, thereby forming an Fe-M-V alloy melt;
   (c) oxidizing substantially only V in said Fe-M-V alloy melt by adding an oxygen gas to form a V-oxide-containing slag with a small phosphorus content and an Fe-M alloy melt, and
   (d) separating said V-oxide-containing slag from said Fe-M alloy melt.

8. The method for recovering valuable metals according to claim 7, comprising repeating, after said step (d), at least one cycle comprising the steps of
   (e) adding a fresh roasted ore, a flux, and a reducing agent composed of metallic Al and/or Si to said Fe-M alloy melt, to reduce the oxides of said valuable metals, so that said valuable metals are dissolved in said Fe-M alloy melt;
   (f) oxidizing substantially only V in the resultant Fe-M-V alloy melt by adding an oxygen gas to form a V-oxide-containing slag with a small phosphorus content and an Fe-M alloy melt; and
   (g) separating said V-oxide-containing slag from said Fe-M alloy melt.

9. The method for recovering valuable metals according to claim 7, comprising repeating, after said step (d), at least one cycle comprising the steps of
   (e-1) adding a fresh roasted ore and a flux to said Fe-M alloy melt, so that the fresh roasted ore is dissolved in said melt;
   (e-2) adding a reducing agent composed of metallic Al and/or Si to said melt, to reduce the oxides of said valuable metals so that said valuable metals are dissolved in said Fe-M alloy melt;
   (f) oxidizing substantially only V in the resultant Fe-M-V alloy melt by adding an oxygen gas to form a V-oxide-containing slag with a small phosphorus content and an Fe-M alloy melt; and
   (g) separating said V-oxide-containing slag from said Fe-M alloy melt step.

10. A method for recovering valuable metals from a waste, comprising the steps of
    (a) roasting said waste comprising P and said valuable metals, wherein said valuable metals comprise V and at least one selected from the group consisting of Mo, Ni and Co, to form a roasted ore containing oxides of said valuable metals;
    (b-1) heating said roasted ore together with an iron source and a flux, to form an iron-based alloy melt;
    (b-2) adding a reducing agent composed of metallic Al and/or Si to said melt, thereby reducing the oxides of said valuable metals to form an Fe-M-V alloy melt;
    (c) oxidizing substantially only V in said Fe-M-V alloy melt by adding an oxygen gas to form a V-oxide-containing slag with a small phosphorus content and an Fe-M alloy melt; and
    (d) separating said V-oxide-containing slag from said Fe-M alloy melt.

11. The method for recovering valuable metals according to claim 10, comprising repeating, after said step (d), at least one cycle comprising the steps of
    (e) adding a fresh roasted ore, a flux, and a reducing agent composed of metallic Al and/or Si to said Fe-M alloy melt, to reduce the oxides of said valuable metals, so that said valuable metals are dissolved in said Fe-M alloy melt;
    (f) oxidizing substantially only V in the resultant Fe-M-V alloy melt by adding an oxygen gas to form a V-oxide-containing slag with a small phosphorus content and an Fe-M alloy melt; and
    (g) separating said V-oxide-containing slag from said Fe-M alloy melt.

12. The method for recovering valuable metals according to claim 10, comprising repeating, after said step (d), at least one cycle comprising the steps of (e-1) adding a fresh roasted ore and a flux to said Fe-M alloy melt, so that the fresh roasted ore is dissolved in said melt;

(e-2) adding a reducing agent composed of metallic Al and/or Si to said melt, to reduce the oxides of said valuable metals so that said valuable metals are dissolved in said Fe-M alloy melt;

(f) oxidizing substantially only V in the resultant Fe-M-V alloy melt by adding an oxygen gas to form a V-oxide-containing slag with a small phosphorus content and an Fe-M alloy melt; and (g) separating said V-oxide-containing slag from said Fe-M alloy melt step.

* * * * *